UNITED STATES PATENT OFFICE.

GEORGE H. COOK, OF NEW BRUNSWICK, NEW JERSEY.

IMPROVED MODE OF SEPARATING COMPOUNDS OF IRON FROM THE WATER OF SALT WELLS AND SPRINGS.

Specification forming part of Letters Patent No. 33,574, dated October 29, 1861.

*To all whom it may concern:*

Be it known that I, GEORGE H. COOK, of the city of New Brunswick, in the county of Middlesex and State of New Jersey, have invented a new and improved mode of hastening the separation or precipitation of the oxide or other compound of iron from the water or brine of salt springs and wells; and I do hereby declare that the following is a full and exact description of the substance used and the process required.

It is well known that the salt-water from wells or springs almost always contains oxide or other chemical compound of iron in solution; that it is at first quite colorless, but in a short time after it has been drawn becomes turbid and reddish in appearance, owing to the liberation of peroxide of iron; that this compound of iron must be removed from the salt-water, or it will remain to discolor and so damage the salt made from it; that by allowing the brine to remain exposed to the air for a few days this compound of iron is completely precipitated and the brine left pure therefrom; that the addition of quicklime hastens this precipitation of the compound of iron; and that the precipitation can also be hastened by heat; but the processes mentioned are somewhat slow, requiring from one to six days for the complete separation of the iron compound, and of course requiring the construction of reservoirs large enough to contain salt-water for supplying the works an equal number of days; and it is also believed that the quality of salt made from brine which has been settled by lime is not as good as it otherwise would be.

To precipitate or separate the compound of iron from brine, I use the black or peroxide of manganese. It is applied by taking it in fine powder and thoroughly stirring it up or agitating it in a vessel or reservoir of the brine. The change in the chemical condition or state of the iron takes place almost immediately; and within a few minutes after the precipitant has been added brine free from oxide or other compound of iron can be drawn from the reservoir, providing a simple filter or strainer, made of woolen cloth or other suitable material, can be used to strain out the particles of oxides of iron and manganese which are suspended in the fluid. By standing a few hours the brine becomes settled and clear, so that it can be drawn pure without the use of a filter. The amount of oxide of manganese needed to effect the precipitation of the oxide of iron should be chemically equivalent to the peroxide of iron precipitated, which is in the ratio of about eighty-eight parts of the black or peroxide of manganese to eighty parts of peroxide of iron; but as the commercial oxide of manganese is not generally pure, and, moreover, as any excess which may be used remains to be stirred up with the next filling of brine, it is best to add at least twice as much oxide of manganese as there is of the oxide of iron to be precipitated.

What I claim as my invention, and desire to secure by Letters Patent, is—

The use of black or peroxide of manganese in hastening the separation or precipitation of oxide or other compound of iron from the water of salt springs or wells.

GEO. H. COOK.

Witnesses:
PETER P. RUNYON,
M. CODDINGTON.